(12) United States Patent
Johnson

(10) Patent No.: US 6,910,352 B2
(45) Date of Patent: Jun. 28, 2005

(54) DEPOSITION OF HIGH FLUORINE CONTENT SILICA SOOT

(75) Inventor: William W Johnson, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 469 days.

(21) Appl. No.: 10/132,021

(22) Filed: Apr. 24, 2002

(65) Prior Publication Data

US 2003/0200770 A1 Oct. 30, 2003

(51) Int. Cl.$^7$ .................... C03B 37/075; C03B 37/018
(52) U.S. Cl. .................. 65/397; 65/413; 65/531
(58) Field of Search .................. 65/429, 397, 413, 65/414, 421, 520, 530, 531

(56) References Cited

U.S. PATENT DOCUMENTS

| | | | | |
|---|---|---|---|---|
| 4,336,049 A | * | 6/1982 | Takahashi et al. | 65/390 |
| 4,406,680 A | * | 9/1983 | Edahiro et al. | 65/416 |
| 4,604,118 A | * | 8/1986 | Bocko et al. | 65/416 |
| 4,618,354 A | * | 10/1986 | Suda et al. | 65/416 |
| 4,627,866 A | * | 12/1986 | Kanamori et al. | 65/397 |
| 4,804,247 A | * | 2/1989 | Kyoto et al. | 385/142 |
| 4,812,155 A | | 3/1989 | Kyoto et al. | 65/3.12 |
| 5,366,531 A | * | 11/1994 | Koide et al. | 65/415 |
| 5,599,371 A | * | 2/1997 | Cain et al. | 65/413 |
| 5,788,730 A | * | 8/1998 | Ruppert et al. | 65/17.4 |
| 6,087,283 A | * | 7/2000 | Jinbo et al. | 501/54 |
| 6,260,385 B1 | * | 7/2001 | Sempolinski et al. | 65/17.4 |
| 6,296,826 B1 | * | 10/2001 | Fujinoki et al. | 423/335 |
| 6,374,639 B2 | | 4/2002 | Komine et al. | 65/17.4 |
| 6,598,425 B1 | * | 7/2003 | Hawtof et al. | 65/17.4 |
| 6,672,106 B1 | * | 1/2004 | Hawtof et al. | 65/17.2 |
| 6,748,768 B2 | * | 6/2004 | Lehman et al. | 65/413 |
| 2001/0032482 A1 | * | 10/2001 | Hawtof | 65/17.4 |
| 2002/0005051 A1 | * | 1/2002 | Brown et al. | 65/414 |

FOREIGN PATENT DOCUMENTS

| | | | |
|---|---|---|---|
| EP | 0 146 659 | 3/1988 | C03C/13/04 |
| EP | 0 878 451 A1 | 11/1998 | C03C/3/06 |
| EP | 0901 989 A1 | 3/1999 | C03B/19/14 |
| WO | WO 01/83388 A2 | 11/2001 | C03B/37/014 |

OTHER PUBLICATIONS

JP59162143A2: Production of Synthetic Quartz, Haruo et al. Application JP1983000034826; Intellectual Property Network, Nov. 10, 2000.
JP59184740A2: Manufacture of Base Quartz Material for Optical Fiber, Haruo et al. Application JP1983000059784; Intellectual Property Network, Nov. 10, 2000.
JP11116248A2: Synthetic Quartz Glass Member, Akiko et al. Application JP1997000279118; Intellectual Property Network, Nov. 10, 2000.
JP7291635A2: Production of Synthetic Quartz Glass Member, Hisatoshi et al. Application JP1994000091555; Intellectual Property Network, Nov. 10, 2000.

* cited by examiner

*Primary Examiner*—Steven P. Griffin
*Assistant Examiner*—Carlos Lopez
(74) *Attorney, Agent, or Firm*—Timothy R. Krogh; Kevin M. Able

(57) ABSTRACT

The invention includes methods of making a fluorine doped soot particle. One method of the invention includes the steps of (1) delivering a silicon containing precursor to a first opening in a burner face; (2) delivering a source of oxygen to a second opening, wherein the second opening is spaced apart from the first opening such that the silicon precursor and oxygen source react to form a soot particle having a surface area of more than about 20 m$^2$/g; and (3) delivering a fluorine precursor to a third opening, said third opening is spaced apart from the first opening. A second method of the invention includes the steps of (A) delivering a silicon containing precursor to a first opening in a burner face; (B) delivering a fluorine precursor to a second opening, wherein said second opening is spaced apart from said first opening; and (C) delivering a fuel to a third opening, said third opening is spaced apart from said first opening.

34 Claims, 11 Drawing Sheets

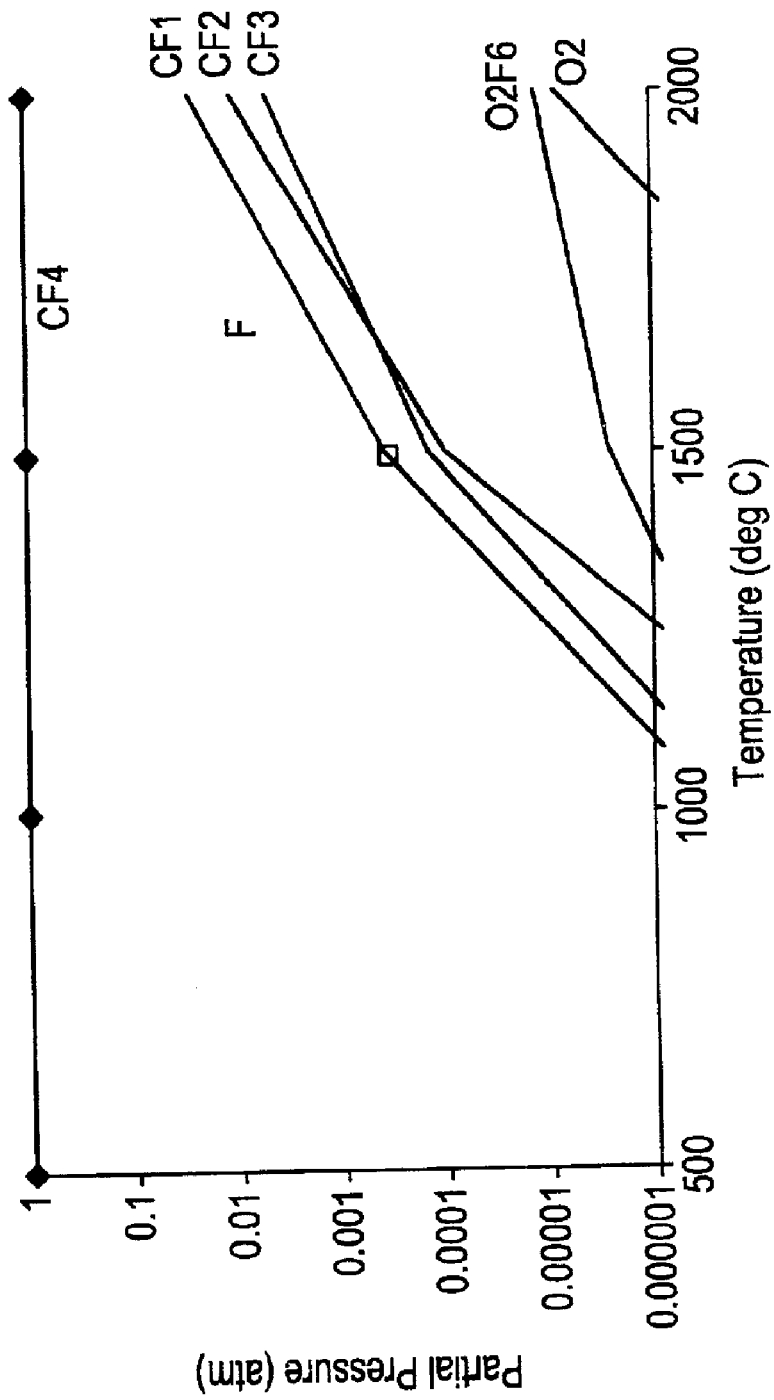

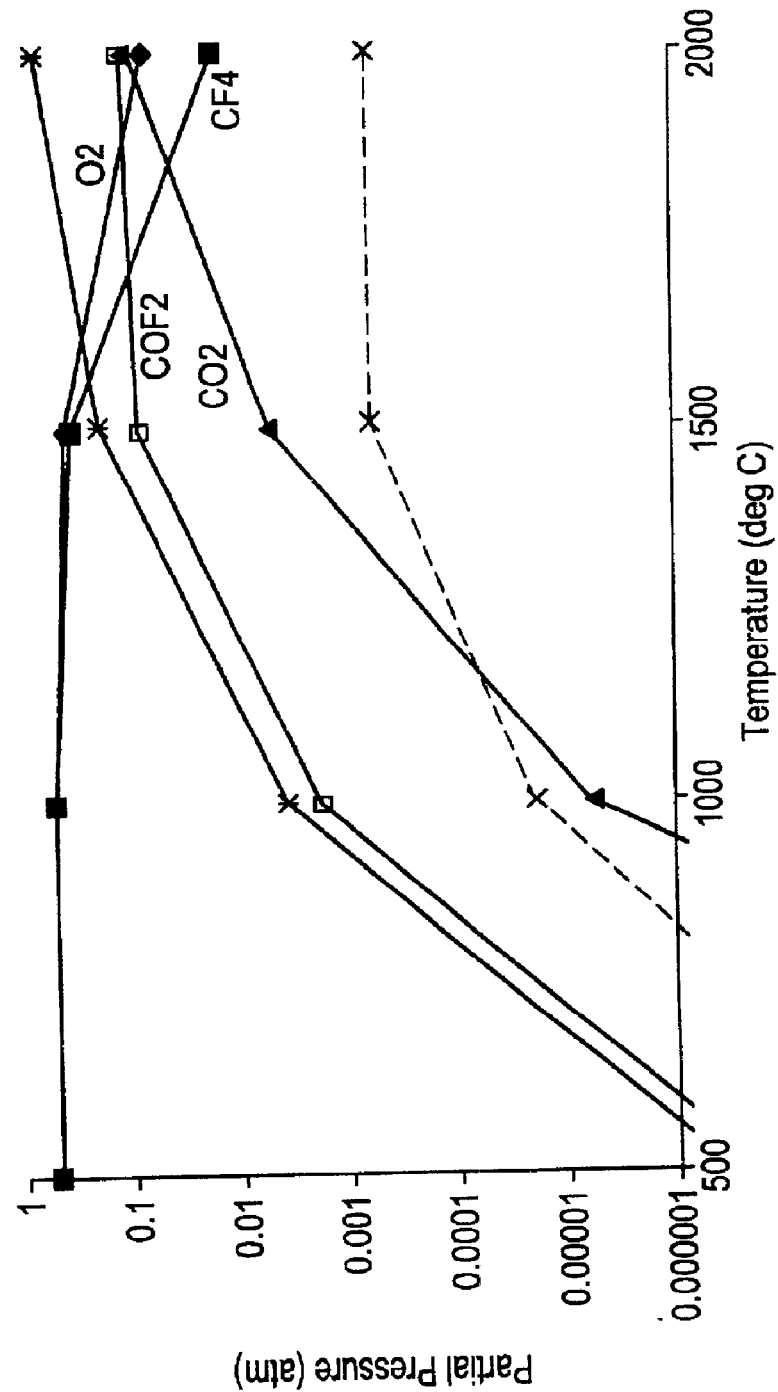

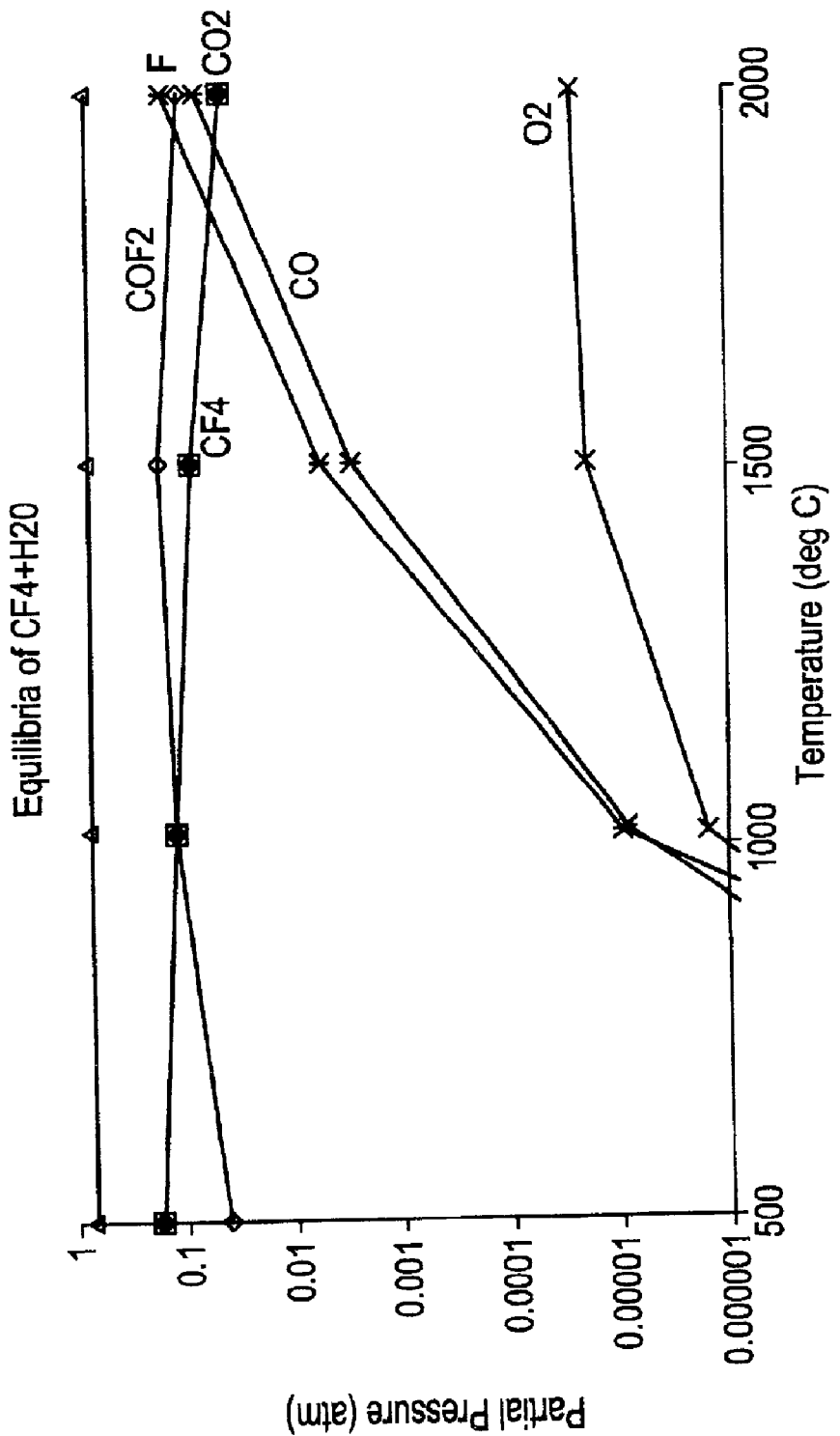

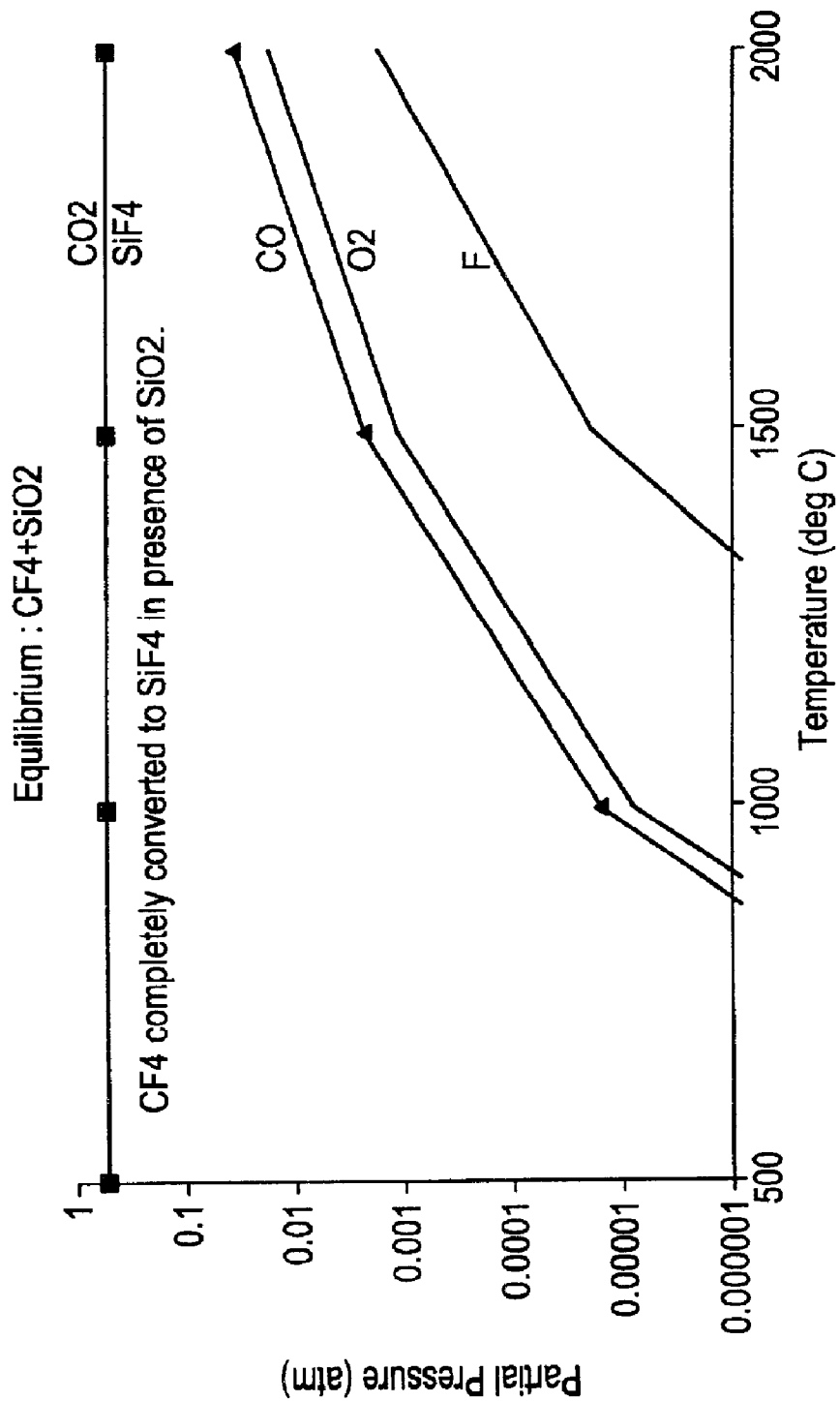

DEPOSITION OF HIGH FLUORINE CONTENT SILICA SOOT

BACKGROUND OF THE INVENTION

1. Field of the Invention

The present invention relates generally to the manufacturing of optical fibers, and particularly to manufacturing a fluorine doped preform from which an optical fiber may be drawn from the preform.

2. Technical Background

Optical fibers have acquired an increasingly important role in the field of communications, frequently replacing existing copper wires. This trend has had a significant impact in the local area networks (i.e., for fiber-to-home uses), which have seen a vast increase in the usage of optical fibers. Further increases in the use of optical fibers in local loop telephone and cable TV service are expected, as local fiber networks are established to deliver ever-greater volumes of information in the form of data, audio, and video signals to residential and commercial users. In addition, use of optical fibers in home and commercial business environments for internal data, voice, and video communications has begun and is expected to increase.

Optical fibers having a fluorine doped region have unique attributes which make them useful as long haul optical fibers, dispersion compensating optical fibers, dispersion slope compensating optical fibers, and high data rate optical fibers. The ability to include fluorine in a preform is an important aspect of producing an optical fiber with a fluorine-doped region.

Prior attempts to incorporate fluorine into the preform include depositing fluorine-doped soot on a starting member. Typically, the starting member was a sintered core cane. During deposition, $CF_4$ is usually added to the fume tube of the burner with $SiCl_4$ and $O_2$ and reacted in a $CH_4/O_2$ flame. The fume tube or fume is used herein to describe an opening in the center of the exterior surface of the burner. However, in the past, deposited fluorine has shown to be a volatile compound and exhibited significant migration from the region or regions of interest. In addition to migration of fluorine in the preform, the fluorine incorporated into the soot preform during deposition can vaporize and diffuse from the preform either during subsequent deposition or during consolidation. The diffusion of fluorine from the preform and migration of fluorine from regions of interest has collectively been commonly known as "loss", referring to the loss of deposited fluorine from areas of interest of the sintered preform. Preforms fluorinated during deposition have exhibited a fluorine loss between forty (40%) percent to fifty (50%) weight percent. In light of fluorine migration and diffusion, the deposition of fluorinated soot has not proven to be practical.

The aforementioned loss of fluorine can also cause a loss of profile shape, reduction in depth of a fluorine moat in resultant preform or fiber, and/or induce significant aging effects such as the fiber exhibiting an increase in attenuation as the useful life of the fiber is extended.

One reason for the low retention rate of fluorine is the production of the compound $SiF_4$ during manufacturing. Typically $SiF_4$ generated during manufacturing can volatilize off during subsequent high temperature processing such as additional deposition or consolidation.

A countermeasure to the migration is to confine the fluorine containing region in the soot blank by bounding the area to have a fluorine-doped region between two densified glass barrier layers. However, methods of forming the barrier layers can be significant sources of attenuation of a signal traveling down the fiber. Known methods of forming a barrier layer include heating at least a layer of unconsolidated soot to sintered glass with an oxy-hydroylsis torch and to deposit soot on the sintered glass layer. The glass surface formed by the torch heating step can contain a significant amount of hydroxyl ions, which are known attenuation sources.

With respect to consolidation doping, $CF_4$ is typically added to the consolidation atmosphere after a $Cl_2$ drying step. The fluorine content of the soot preform reaches an equilibrium with the gas phase $CF_4$ and the sintering of the preform traps a certain level of fluorine in the sintered glass. Consolidation doping may be used to achieve a fluorine level of up to 2.1 wt % (−0.6 Δ% compared to undoped silica) of fluorine in the sintered glass. A disadvantage of consolidation doping is that every region in the profile containing or bordering a fluorine-doped region will require a separate deposition-consolidation cycle. This greatly increases the process steps for making the glass preform and reduces potential capacity of the glass manufacturing facility.

A fluorine doping method is needed that enables deeper moat levels which does not reduce deposition rates to impractical levels.

SUMMARY OF THE INVENTION

One aspect of the invention is a method of making a fluorine-doped soot. The method includes the steps of (1) delivering a silicon containing precursor to a first opening in a burner face; (2) delivering a source of oxygen to a second opening in the burner face, wherein said second opening is spaced apart from the first opening such that the silicon precursor; and (3) delivering a fluorine precursor to a third opening of the burner face, the third opening is spaced apart from the first opening. Optionally, the delivering of the oxygen source occurs at a rate effective to substantially prevent fluorine from the fluorine precursor from reacting with the silicon precursor prior to formation of the particle. Preferably the oxygen source reacts to form a soot particle having a surface area of more than about 20 $m^2/g$.

In another aspect, the invention includes a second method of making a fluorine-doped soot. This method includes the steps of (1) delivering a silicon containing precursor to a first opening in a burner face; (2) delivering a fluorine precursor to a second opening in the burner face, wherein the second opening is spaced apart from the first opening; and (3) delivering a fuel to a third opening of the burner face, the third opening is spaced apart from the first opening. Preferably, the delivering of the fuel comprises substantially reacting the fuel with fluorine from the fluorine precursor prior to the fluorine from the fluorine precursor reacting with the silicon-containing precursor.

The method also includes a relationship of alignment among the first, second, and third openings sufficient to result in the fluorine precursor and the fuel reacting to form HF in a concentration greater than a concentration of $SiF_4$ formed from a reaction of the fluorine precursor with the silicon containing precursor.

An advantage of the invention is that the invention may be used to deliver raw materials to an optical fiber burner to increase the amount of fluorine incorporated into a soot particle during soot deposition. The invention may be used to form a soot particle with a surface area that is advantageous for doping the particle with fluorine. A nonexhaustive list of suitable surface areas includes at least about 20 $m^2/g$ or more, about 25 $m^2/g$ or more, about 30 $m^2/g$ or more, and about 35 $m^2/g$ or more.

A further advantage of the invention is that the invention may be used to increase the concentration of fluorine doping species in an atmosphere for fluorine doping a soot particle during deposition. Such fluorine doping species includes at least mono-atomic F, $COF_2$, COF, or HF. The invention may also be used to minimize the formation of the fluorine into a less desirable compounds, such as $SiF_4$ or $F_2$.

The invention may be used to enhance the incorporation of fluorine into a soot particle during deposition by producing a particle with a favorable diameter. Particles formed in accordance with the invention have a diameter of about 0.1 $\mu$m or smaller. In comparison, soot particles made in accordance with a conventional process typically have a diameter of at least about 0.2 $\mu$m. Examples of diameters of soot particles made in accordance with the invention include about 0.1 $\mu$m, about 0.075 $\mu$m, about 0.05 $\mu$m, and about 0.01 $\mu$m. Soot particles with a favorable diameter have a larger surface area than conventional soot particles. It is believed that soot particle having a higher surface area are favorable for doping for at least the reason that soot particles with higher surface area are able to retain greater amounts of fluorine than soot particles with conventional surface areas.

The invention may also be used in conjunction with fluorine consolidation doping. If higher fluorine content is desired than achieved during deposition of fluorine-doped soot, the preform may be doped in consolidation. Doping during consolidation would enable additional fluorine to be incorporated into the preform.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

BRIEF DESCRIPTION OF THE DRAWINGS

FIGS. 7–10 illustrate the formation of fluorine doping species in different environments and at different temperatures.

DETAILED DESCRIPTION OF THE PREFERRED EMBODIMENTS

Figure 1:
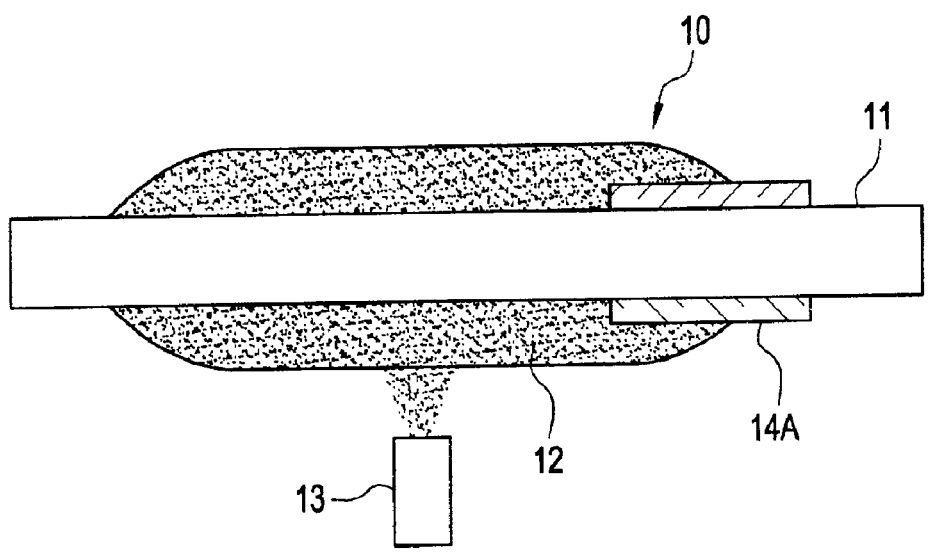
FIG. 1 is a schematic cross sectional view of a soot deposition process.

Reference will now be made in detail to the present preferred embodiment(s) of the invention, examples of which are illustrated in the accompanying drawings. Whenever possible, the same reference numerals will be used throughout the drawings to refer to the same or like parts. One embodiment for depositing fluorine doped soot in accordance with the present invention is shown in FIG. 1, and is designated generally throughout by the reference numeral 10.

As shown in FIG. 1, a soot preform 12 is formed from a chemical vapor deposition ("CVD") process. Preform 12 can be formed by various CVD processes such as outside vapor deposition ("OVD"), vapor axial deposition ("VAD"), and outside plasma chemical vapor deposition ("OPCVD" or (Plasma Outside deposition) "POD"). In FIG. 1, soot is deposited via OVD, from burner 13 onto a starting member 11 to form preform 12. Though, FIG. 1 illustrates a soot deposition process, the invention is equally applicable to a glass deposition process, such POD. Starting member 11 is preferably an alumina mandrel. Also shown is a handle 14A attached to starting member 11.

Preferably, the soot being deposited is silica based soot. Typically silica based soot is formed from a precursor that comprises a silicon containing compound, such as a silicon halide (e.g. $SiCl_4$), an alkoxy silicon, a siloxane (e.g.$C_8H_{24}O_4Si_4$), an alkyl silicon, and combinations thereof. The silica based soot may be doped silica or undoped silica. Soot is used herein to mean unconsolidated silica based glass particles. Likewise in any glass process, the glass particle formed may be doped or undoped glass. In relation to soot particles, glass particles is defined herein to mean consolidated soot particles.

Preferably, preform 12 may have one or more regions of doped silica soot. For example, but not limited to, a radial region of the preform may be silica soot doped with at least one of the following elements Ge, P, Al, Sb, Ta, B, Ga, In, Sb, Er, Li, Na, K, Rb, Cs, Be, Mg, Ca, Sr, Ba, Ti, Se, Te, Fr, Ra, Bi, or mixtures thereof. Preform 12 may also have one or more regions of undoped silica soot.

In accordance with the present invention, preform 12 includes at least one region of fluorine-doped soot. Preferably, the fluorine doped soot is formed during deposition of the soot. It is preferred that the fluorine-doped soot particles are formed in a manner that maximizes the surface area of the soot particle, such that the soot particle to be doped with fluorine has a surface area comprising more than about 20 $m^2/g$, more preferably more than about 25 $m^2/g$, even more preferably more than about 35 $m^2/g$, and most preferably at least about 45 $m^2/g$. Using the methods disclosed herein, surface areas that have been achieved include about 21 $m^2/g$ or more, about 30 $m^2/g$ or more, about 40 $m^2/g$ or more, and about 50 $m^2$ g or more.

One technique to determine the surface area of a soot particle is disclosed in ASTM standard D993, Standard Test Method for Precipitated Silica Surface Area by Multipoint BET Nitrogen Absorption. ASTMD 1993 which is hereby incorporated herein by reference in its entirety. In a second method a precalibrated sample cell is weighed. An appropriate amount of sample is placed in the cell. The cell containing sample is placed in a mantle at 300° C. under helium flow for 1 hour. The sample cell is removed from the mantle and allowed to cool under the helium flow. The sample cell is reweighed and the mass of the sample is determined. The sample cell is then placed in a nitrogen gas based surface area analyzer, e.g., NOVA from Quantachrone Corp. and the analyzer is started. The analyzer introduces nitrogen into the sample cell at specified pressures. The analyzer applies nitrogen at a given pressure until it determines that equilibrium has been reached. It then calculates the amount of gas introduced to reach equilibrium. Once this has been completed the analyzer moves on to the next predetermined pressure point. For a Multipoint BET the analyzer takes 5 points of data-$P/P_o$; 0.1, 0.15, 0.2, 0.25, 0.3. When completed the analyzer calculates the Multipoint BET (from all the data) and the Single Point BET (determined solely form the data taken at $P/P_o$ 0.3). The surface area of the soot particle is calculated form the Multipoint BET.

It is also preferred that when the fluorine is incorporated into the soot particles, the generation of $SiF_4$ is minimized during the fluorine doping portion of the soot deposition. It is further preferred that the invention is practiced to maximize the formation of fluorine species suitable for doping a soot particle, e.g., HF, $COF_2$, or monatomic F. Preferably, the fluorine doping species has a partial pressure of at least about 0.20 atm in the deposition atmosphere, more preferably at least about 0.30 atm, even more preferably at least about 0.35 atm, and most preferably at least about 0.40 atm. The partial pressure of the fluorine doping species in the deposition atmosphere may be at least as high as 0.45 atm.

Figure 2:
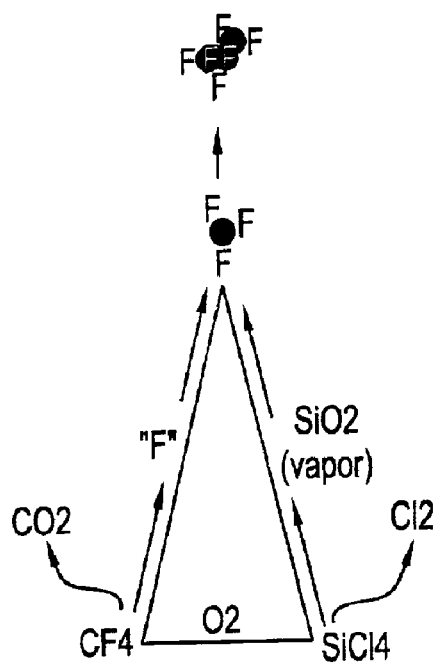
FIG. 2 is a block schematic illustration of an embodiment of the invention forming a fluorine-doped soot particle in accordance with the invention.

FIG. 2 is a block schematic diagram illustrating how fluorine can be incorporated into a soot particle in accordance with the invention. In the embodiment shown in FIG. 2, a silicon precursor, such as $SiCl_4$, is reacted with a source of oxygen ($O_2$) to form $SiO_{2(g)}$. As the $SiO_{2(g)}$ cools, the gaseous $SiO_2$ condenses and forms a soot particle. The silicon precursor and the oxygen are preferably delivered to different openings of the face of a burner (not shown) and are not in contact until after each material exits the burner.

A fluorine precursor ($CF_4$) is substantially reacted with oxygen to form a species of fluorine (e.g., HF, $COF_2$, or F) suitable for doping the soot particle. Preferably, the oxygen and the fluorine precursor are also delivered to different openings of the face of the burner and are not in contact until after each material exits the burner. As shown in FIG. 2, the fluorine precursor is reacted with the oxygen source to from a $CO_2$ by-product and fluorine doping species mono-atomic F. Preferably, the fluorine species suitable for doping reacts with the soot particle prior to the soot particle undergoing agglomeration with other soot particles. Preferably after agglomeration, the soot particle is deposited onto preform 12. A benefit of the embodiment of the invention illustrated in FIG. 2 is the fluorine precursor does not react with the silicon precursor to form a substantial amount of the volatile compound $SiF_4$ in relation to the amount of F doping species formed. The invention is not limited to the use of $CF_4$ as the fluorine precursor, other suitable fluorine precursors include $C_2F_6$, $C_3F_8$, $SF_6$, and combinations thereof.

Figure 3:
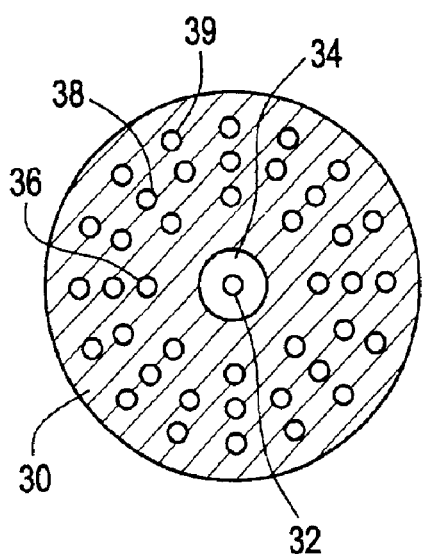
FIG. 3 is a front view of one embodiment of a burner face for depositing soot onto a preform.
Figure 4:
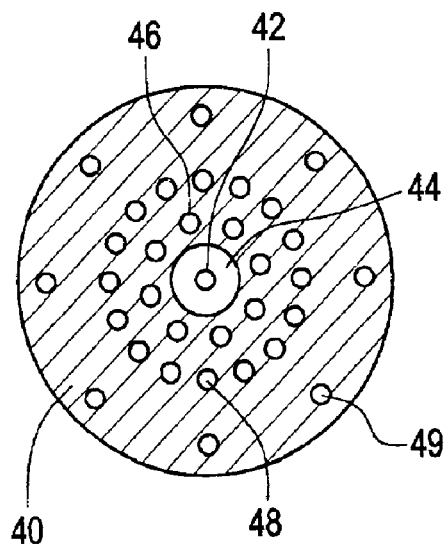
FIG. 4 is a front view of a second embodiment of a burner face for depositing soot onto a preform.

The concepts behind FIG. 2 are further illustrated in accordance with FIGS. 3 and 4. FIGS. 3 and 4 are front views of two different burner faces that may be used as burner 13 of FIG. 1. In a burner face 30 illustrated in FIG. 3, a silicon containing precursor is delivered via a fume tube 32 of burner face 30. In the embodiment of face 30, fume 32 is illustrated as a single circular opening. One potential silicon precursor is $SiCl_4$, however, the invention is not limited to $SiCl_4$ as the silicon precursor. Any silicon compound suitable for forming a glass soot may be used. Optionally, an inert material may also be delivered through fume 32 along with the silicon precursor. Preferably, a fluorine containing precursor is not substantially delivered through fume 32. Preferably, fume 32 is also substantially devoid of an oxygen source. Opening 32 is substantially devoid of oxygen is defined herein to mean the silicon precursor contains less than about 5% oxygen by vol., preferably less than 4%, more preferably less than 2%, and most preferably less than 1%. Opening 32 is substantially devoid of fluorine is defined herein to mean the silicon precursor contains less than about 5% oxygen by vol., preferably less than 4%, more preferably less than 2%, and most preferably less than 1%.

Optionally, an oxygen source may be delivered through opening 34 of burner face 30. Preferably, the oxygen source is delivered to in an amount effective to convert substantially all of the silicon of the silicon precursor into silica particles having the aforementioned surface area. However, the necessary oxygen for oxidation of silicon may be supplied by another opening or from ambient air. It is also preferred that the oxygen source is present in an amount sufficient to react with a sufficient amount of the fluorine precursor to form a species of fluorine suitable for doping the soot particle. Such suitable species of fluorine include HF, F, and $COF_2$. It is further preferred that a sufficient amount of oxygen is available to react the fluorine precursor to minimize the formation of $SiF_4$ from any reaction between the fluorine precursor and the silicon precursor. A fluorine precursor may also be delivered to burner face 30 through opening 34. In the embodiment illustrated, opening 34 is depicted as an annulus.

Burner face 30 also includes openings 36, 38, and 39. Preferably, a fluorine precursor may be delivered to burner face 30 through opening 36. In FIG. 3, opening 36 is illustrated as 8 openings equally spaced apart around opening 32. A suitable fluorine precursor is $CF_4$, however, other fluorine precursors may be used to practice the invention as noted above. The various fluorine precursors may also be used in combination. In addition to the fluorine precursor, other components such as an oxygen source, a fuel, an inert gas, or a carrier gas may also be supplied through opening 36. However, it is preferred that the fluorine precursor is not delivered through the same opening as the silicon precursor. The fluorine precursor is not limited to being supplied via opening 36, and the fluorine may be supplied through openings 38 and/or 39 along with or instead of through opening 36.

As illustrated in FIG. 3, a fuel is supplied to burner face 30 through opening 38. As shown, opening 38 may comprise 16 opening equally spaced apart around opening 32. Examples of suitable fuels include methane, ethane, propane, natural gas, other hydrocarbons, hydrogen, carbon monoxide, and combinations thereof. Optionally, other materials such as an oxygen source and/or a fluorine precursor may also be supplied through opening 38.

It is preferred that the fuel is supplied in an effective amount for forming a flame and to react a significant portion of the fluorine precursor to form the reaction product HF or another suitable fluorine doping species. The reaction of the fuel and the fluorine precursor is defined herein to also include the reaction product of the combustion of the fuel with the fluorine precursor. For example if the fuel and oxygen may react to form $H_2O$, $H_2$, H, or CO, the fuel (including the combustion reaction products) and fluorine precursor may react to form any one of the following doping species: HF, F, and $COF_2$. In one embodiment of the invention, it is preferred that there is an equal molar amount of H available from the fuel as compared to F available from the fluorine precursor to form HF. In another embodiment of the invention, the molar amount of F available from the fluorine precursor is greater than the molar amount of H available from the fuel. With respect to the fuel and the oxygen source for combustion, preferably, the $O_2$ flow is usually equal to about 0.9 of the flow of $CH_4$ to reduce burning velocity and prevent flashback. Additional $O_2$ to complete combustion may come from one of the other openings in the burner face or ambient make-up air.

In FIG. 3, it is shown that an oxygen source is supplied through opening 39. Another suitable oxygen source may include air, preferably dry air. However, the invention is not limited to an oxygen source supplied through opening 39. In addition to oxygen or instead of oxygen, a fuel or fluorine precursor may also be supplied through opening 39. As shown, opening 39 may comprise 16 openings equally spaced apart around opening 32. The invention is not limited to the openings on burner face 30 having the particular orientation shown in FIGS. 3 and 4.

Illustrated in FIG. 4 is an embodiment of a burner face 40 that differs from burner face 30. In addition to the pattern of the openings 46, 48, and 49 of burner face 40 as compared to openings 36, 38, and 39 of burner face 30, the relationship between where the fluorine precursor and fuel supplied to burner face 40 may differ from burner face 30. As disclosed herein, in FIG. 4 the fuel may be supplied to burner face 40 through opening 46 and the fluorine precursor supplied to burner face 40 through opening 48. In FIG. 4, the silicon precursor is delivered to burner face 40 via opening 42 and oxygen may be delivered to burner face 40 via opening 44. Oxygen may also be delivered to burner face 40 via opening 49. Unlike FIG. 3, the fuel in FIG. 4 may be radially closer to the silicon precursor than the fluorine precursor.

As illustrated in FIG. 4, opening 42 comprises a circular cross-section and opening 44 comprises an annulus. Furthermore, openings 46 and 49 are respectively illustrated as 8 openings equally spaced apart around opening 42 and opening 48 is shown as 16 openings equally spaced apart around opening 42. As depicted in FIG. 4, opening 46 is spaced closer to opening 42 than opening 49 is spaced from opening 42.

In addition to the embodiments depicted in FIGS. 3 and 4, another suitable burner that may be used to practice the invention is a burner which comprises a series of coaxially aligned tubes as shown in the following U.S. Pat. Nos. 4,345,928, 4,406,680, 4,406,684, and 4,618,354. The tubes may have a circular periphery or rectangular periphery. The aforementioned U.S. patents are incorporated herein by reference in their entirety.

With respect to FIGS. 3 and 4, the invention is not limited to the use of precursors as disclosed with respect to the figures. The figures only represent two different burner face configurations and one configuration of the supply of materials for forming fluorine-doped soot particles for each respective burner face. Other configurations of the supply of materials to the respective burner faces are clearly within the scope of the invention as well as other burner face configurations, e.g., concentric ring nozzles. Preferably the materials may be delivered to either burner face 30 or 40 in any configuration that minimizes the formation of $SiF_4$ and be within the scope of the invention. Non-exhaustive examples of various burner configurations that are within the scope of the invention are listed in table 1 below:

TABLE 1

| Fume Tube | 1 | 2 | 3 | 4 | 5 |
|---|---|---|---|---|---|
| $SiCl_4$ | $O_2$ | $CF_4$ | $O_2$ | $CH_4$ and $O_2$ | $O_2$ |
| $SiCl_4$ | $O_2$ | $O_2$ | $CF_4$ | $CH_4$ and $O_2$ | $O_2$ |
| $CF_4$ | $O_2$ | $SiCl_4$ | $O_2$ | $CH_4$ and $O_2$ | $O_2$ |
| $SiCl_4$ | $CF_4$ | $O_2$ | $O_2$ | $CH_4$ and $O_2$ | $O_2$ |

In table 1, the openings are numbered relative to the fume tube. The lower the number, the closer the opening is to the fume tube, e.g., 1 is adjacent the fume tube and 5 is farthest away from the fume tube.

The present invention includes a method of forming a fluorine-doped soot particle. A first step of the invention comprises delivering a silicon containing precursor to a Fume tube opening in a burner face, with respect to FIG. 3, opening 32. The method further includes a second step of delivering a source of oxygen to a opening 1 in the burner face, with respect to FIG. 3, opening 34. Preferably the opening 1 is spaced apart from the fume tube opening such that the silicon precursor and the oxygen source react to form a soot particle having a surface area of more than about 20 $m^2/g$. In an embodiment of the invention, optionally, opening 1 is spaced apart from the fume tube opening such that the silicon precursor and the oxygen source react to form a soot particle having a surface area of about 25 $m^2/g$ or more. The method also includes a third step of delivering a fluorine precursor to an opening 2 of the burner face, regarding FIG. 3, opening 36. The opening 2 is spaced apart from the fume tube opening. The openings 1 and 2 may be the same opening or different openings in the burner face. Preferably, the step of delivering the oxygen source occurs at a rate effective to substantially prevent fluorine of the fluorine precursor from substantially reacting with the silicon precursor prior to formation of the particle.

Preferably the burner face comprises a plurality of openings and the method further comprises the step of delivering a fuel to a burner opening such that the fuel, as previously stated fuel means the combustion component, e.g., $CH_4$, and combustion reaction products, substantially reacts with the fluorine of the fluorine precursor prior to the fluorine of the fluorine precursor reacting with the particle. Preferably, a reaction product of a reaction between the fluorine of the fluorine precursor and the fuel comprises HF. Optionally, the fuel may comprise a H containing compound. Optionally, the burner face may comprise an opening 4 spaced apart from the openings 1 and 2, opening 38 as depicted in FIG. 3, to which the fuel is delivered. The method may also include delivering oxygen to a burner opening 3 between openings 2 and 4, not shown on FIG. 3. Alternatively, openings 3 and 4 may be the same opening or different openings (as cited on table 1) on the burner face.

The invention may further include the step of delivering a second oxygen source to opening 4 with the fuel. The second source of oxygen is delivered in an effective amount to comprise less than about a stoichiometric amount relative to the fuel. As cited in table 1, the method may also include delivering oxygen via an outer opening 5, with respect to FIG. 3, opening 39.

The invention is not limited to the aforementioned orientation of components. Any one of the orientations of components listed in table 1 may be used to practice the invention. Additionally, other orientations of components may be used to practice the invention other than those listed in table 1. For example, the method may include the step of delivering an oxygen source to opening 3 with the fuel, instead of to opening 4. Preferably an effective amount of the oxygen source delivered comprises less than about a stoichiometric amount relative to the fuel.

With respect to particular embodiments of the invention, in one embodiment it is preferred that the fuel and the silicon precursor have a space and temperature relationship such that the fluorine of the fluorine precursor reacts with the fuel to achieve a partial pressure of HF that is much greater than the partial pressure of $SiF_4$. One technique to accomplish the aforementioned relationship between HF and $SiF_4$ is that the fluorine precursor is aligned closer to the fuel than to the silicon precursor. Another technique is to align the fluorine precursor closer to the peak flame temperature than to the silicon precursor. A basis for the second technique is that the formation of HF is thermodynamically favored over $SiF_4$ formation at higher temperatures. A further technique is to align the fluorine precursor, silicon precursor, and oxygen such that the silicon is substantially converted to soot before mixing with fluorine, thereby reducing the gaseous "Si" supply available to react and form $SiF_4$. The third technique would favor the formation of HF instead of $SiF_4$, for at least the reason that more H would be available for the F to bond with than Si.

The method may further include providing the fuel and the fluorine precursor in effective amounts such that the combustion of the fuel results in forming a deposition atmosphere having substantially equal molar amounts of F and H. It is further preferred that a relationship of alignment among the first, second, and third openings comprises the fluorine and the fuel reacting to form HF in a concentration greater than a concentration of $SiF_4$ formed from a reaction of the fluorine precursor with the silicon containing precursor.

Once fluorine-doped preform 12 is formed, preform 12 may be (1) sintered and drawn into an optical fiber; (2) sintered and drawn into a cane; or (3) sintered, additional soot deposited onto the sintered preform to form an overcladded preform and the overcladded preform may be sintered and drawn into a fiber. The aforementioned process to form an optical fiber will be described in greater detail below.

Figure 5:
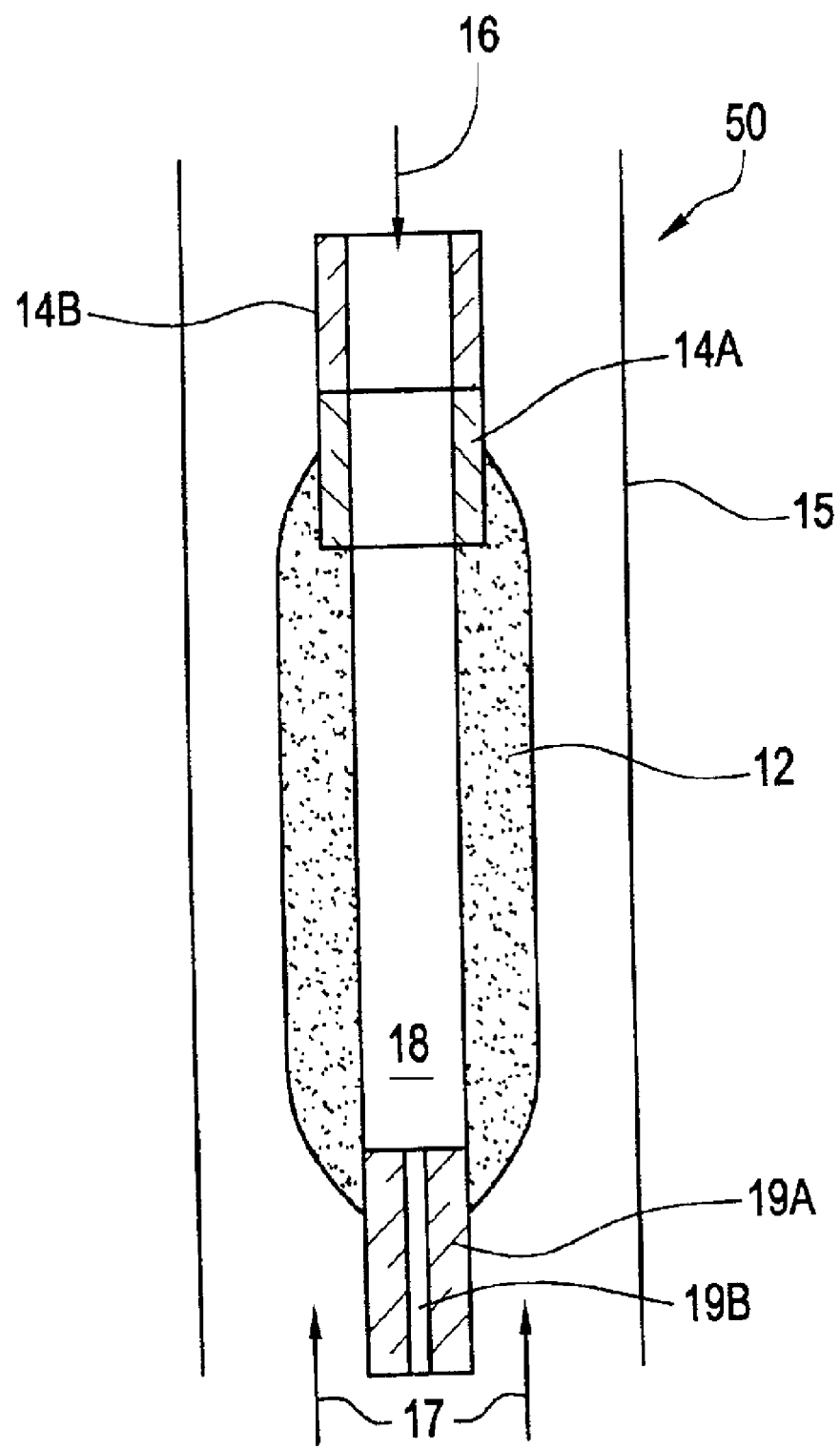
FIG. 5 is a schematic cross sectional view of a porous soot preform in a furnace.

As designated by reference numeral 50 in FIG. 5, preform 12 is suspended in a furnace 15. As shown in FIG. 5, a ball joint 14B is attached to handle 14A. Preform 12 also includes a center passageway 18 and a plug 19A with an optional capillary tube 19B. Plug 19A and ball joint 14B are not required to practice the invention.

Furnace 15 is charged with a gas that flows in the direction of arrows 17. The gas contains the drying agent. The drying agent is a gas that contains a halide and optionally a reducing agent, such as CO, as described in U.S. patent application Ser. No. 09/671,790 filed on or about Sep. 27, 2001. Preferably the gas includes an inert material such as helium, nitrogen, argon, or mixtures thereof. The present invention is not limited to only the listed inert materials. The halide may be present in the drying agent in a pure form or as an element of a compound. For example, the halide may be present in the form of $Cl_2$, $SiCl_4$, or germanium tetrachloride.

The gas may be charged into furnace 15 during a drying operation of preform 12 or during consolidation of preform 12. In the case that furnace 15 is charged during a drying phase, preform 12 is heated to a drying temperature of about 1000 to about 1200° C., inside furnace 15. Preferably, preform 12 is heated to about 1100 to about 1200° C. With respect to a drying temperature, the drying agent may be used to dry a preform at temperatures above about 1600° C., for a glass composition that would sinter at temperatures above about 1600° C.

Preform 12 is maintained at the drying temperature for a period of about one (1) to about four (4) hours. It is preferred that furnace 15 is maintained at the drying temperature for about four (4) hours. Drying the preform will result in drier preforms (a.k.a. blanks) which a fiber may be drawn from.

During the drying process, the halide will react with a hydrogen element or a hydrogen associated with a water molecule or a hydroxyl molecule. The halide may also react with a metal ion of a present metal oxide or the alkali metal ion of a present alkali metal oxide in the soot.

After drying preform 12, optionally center passage 18 is closed and the preform is consolidated. One technique to close passage 18 is applying vacuum to center passage 18. Optionally, the preform 12 may be doped with fluorine or any other dopant in a consolidation doping step.

Preferably, any heat treating step prior to sintering results in an initial reduction in an average pore size of the pores of preform 12 of at least about twenty (20%) percent, further preferred at least about thirty (30%) percent, more preferably at least about forty (40%) percent, and most preferably at least about fifty (50%) percent. Typically, preform 12 will have pores of about 0.1 to about 1.0 μm, preferably, the pore size after heat treating may range from about 0.05 to about 0.8 μm depending on the starting size of the pore.

Preferably, to consolidate perform 12, the drying agent is discharged from furnace 15 and furnace 15 is heated to a temperature of about 1250 to about 1600° C. It is preferred that sintering occurs in an inert atmosphere, such as helium. The atmosphere may optionally include the aforementioned reducing agent. A suitable period of time for preform 12 to sinter is about one (1) to six (6) hours. In a preferred embodiment, the sintering time is four (4) to six (6) hours. However, the sintering period may vary depending on the sintering temperature, the size and density of the preform, and the chemical composition of the preform. Sintering may occur in the same furnace as drying or in a different furnace.

The sintered preform may be drawn into a fiber. The sintered preform is heated to a temperature of about 1800° C. or more and drawn into a fiber. Preferably, the sintered preform is transported to a draw furnace for drawing the preform into the fiber. It is preferred that a muffle is disposed at an exit of the drawing furnace. The fiber is pulled by tractors and stored on a spool. Typical draw rates are 20 m/s or more.

In another embodiment, the drying may take place during sintering. In this embodiment, the drying gas is charged into furnace 15 and furnace 15 is heated to the aforementioned sintering temperature range.

An additional embodiment of the invention includes depositing soot onto a core cane. The soot deposited onto the core cane, preferably, should have a refractive index that is equal to or less than the refractive index of the core region of the core cane. It is preferred that the refractive index of the soot is less than the refractive index of the core region of the core cane. An example of a preferred material deposited on the core cane is silica ($SiO_2$). The silica may be doped with a refractive index increasing dopant or a refractive index decreasing dopant. The soot coated core cane may be referred to as an overcladded core cane or an overcladded preform.

Figure 6:
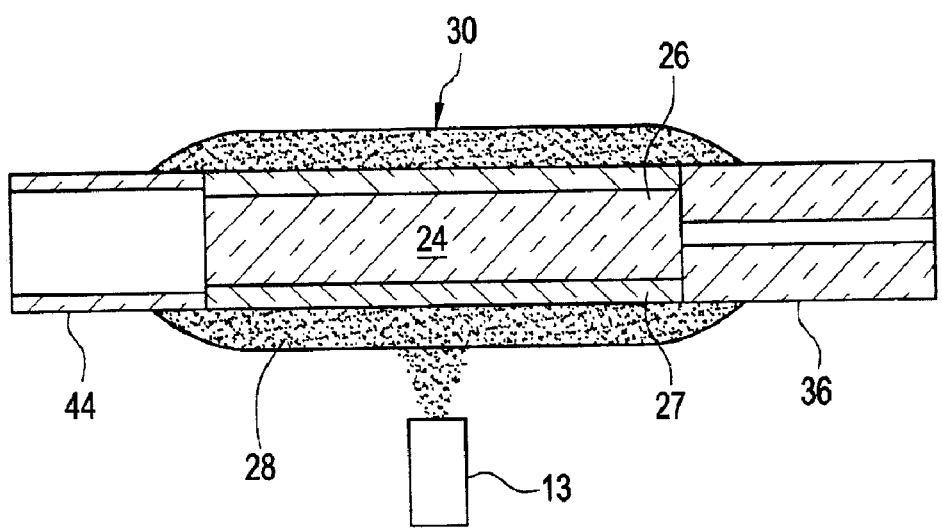
FIG. 6 is a schematic cross sectional view of the deposition of a soot cladding on a core cane.

Depicted in FIG. 6, and generally designated by reference numeral 30, is an overcladded preform 26. Overcladded preform 26 comprises of a core cane 24 and soot 28. Preform 26 is exposed to the aforementioned atmosphere in a furnace 15 for a period of about 1 to about 6 hours at a temperature of about 1000 to about 1600° C. for drying.

It is preferred that the draw blank is exposed to the gas mixture before sintering. One preferred set of reaction parameters includes a gas mixture including up to about 10 weight percent of $Cl_2$. A draw blank a used herein is meant to describe a preform that may be placed into a furnace and drawn into an optical fiber. Preferably, the furnace is heated to a temperature between about 1000 to about 1200° C., more preferably about 1125° C. The draw blank is treated with the gas mixture for preferably about 1 to about 4 hours. Optionally, the gas mixture is discharged from the furnace. The overcladded core cane is then sintered into a draw blank, as described above. The draw blank is preferably transported to a draw furnace and drawn into an optical fiber.

A fiber made in accordance with the invention will have a fluorine doped region. Preferably, the fiber will have a region of depressed refractive index relative to the refractive index of undoped silica. Advantaged features of the fiber may include the ability to control dispersion of the light signal propagating along the fiber or to control the slope of the dispersion exhibited by the light signal propagating along the fiber.

The inventor has discovered that an advantageous environment to dope a soot particle with fluorine is to create an environment of substantially mono-atomic fluorine or HF along with limiting the amount of $SiF_4$ in the environment. The inventor determined that one technique to create the environment is to substantially react the fluorine precursor with an oxygen source or a fuel and correspondingly to minimize the reaction of the fluorine precursor with the silicon precursor.

FIGS. 7–10 are graphs of thermodynamic calculations of the formation of fluorine doping species (e.g., HF, F, and $COF_2$) in different environments at different temperatures. FACTSAGE thermodynamics software (Ecole Polytechnique, Montreal, Canada & GGT Technologies, Herzogenrath, Germany) was used to calculate the partial pressures of specific species of compounds shown in FIGS. 7–10. To conduct a calculation, the initial amounts of each species, the pressure (1 atm), and a range of temperatures were specified. The program calculated the equilibrium state by minimizing the Gibbs Free Energy. The four environments examined were (1) $CF_4$; (2) $CF_4$ and $O_2$; (3) $CF_4$ and $H_2O$; and (4) $CF_4$ and $SiO_2$. The temperature range considered was from about 500 to about 2000° C. In FIG. 7, the $CF_4$ dissociates as the temperature increases and forms F, $CF_2$, $CF_3$, $C_2F_6$, and CF along with residual $CF_4$. As the temperature increases the partial pressure of the fluorine doping species mono-atomic F increases from an undetectable amount at temperatures below about 1000° C. to more than about 0.01 atm at a temperature of about 2000° C.

FIG. 8 is for the environment of $CF_4$ and $O_2$. Similar to FIG. 7, as temperature increases so does the partial pressure of the F. Unlike FIG. 7, in FIG. 8 as the temperature increases the partial pressure of F increases as the partial pressure of $CF_4$ decreases. Furthermore, the dissociation of $CF_4$ in an oxygen environment forms the additional fluorine doping species of $COF_2$. As the temperature increases from more than about 1000° C. to about 2000° C., the concentration of $COF_2$, reaches a maximum value of about 1 atm. From FIG. 8, it is clear that to create a fluorine doping atmosphere with $CF_4$, it is advantageous to dissociate the $CF_4$ in the presence of oxygen.

As illustrated in FIG. 9, an atmosphere of $CF_4$ and $H_2O$ also produces an environment which creates a satisfactory partial pressure of fluorine doping species (HF, F, and $COF_2$). From FIG. 9, it is evident that the $CF_4$ reacts with the $H_2O$ to form HF and $COF_2$, and as temperature increases, the atmosphere will react to from F. From, FIG. 9, it is advantageous to create and an atmosphere which includes $CF_4$ and $H_2O$ for at least the reason that the atmosphere will from the F doping species of HF, $COF_2$, and F. One preferred technique to create the $CF_4$ and $H_2O$ atmosphere is to combust a hydrocarbon fuel, such as $CH_4$ and $O_2$ and to supply $CF_4$ through a burner face, as previously disclosed.

FIG. 10 illustrates that an environment of $CF_4$ and $SiO_2$ is not as advantageous to form fluorine doping species (e.g., HF, $COF_2$, and F) as the previously examined environments. In FIG. 10, it is evident that the formation of a fluorine doping species is less prevalent than any one of the other 3 environments. In this figure significant amounts of $SiF_4$ was formed.

The best fluorine doping atmosphere depicted in FIGS. 7–10 is $CF_4$ and $H_2O$ for the reason that it produces the highest concentration of fluorine doping species. One reason that the above thermodynamic analysis is relevant because the flame of a deposition is consider to be at least about 2000° C.

EXAMPLES

The invention will be further clarified by the following examples. In each of the following examples soot was deposited for about 60 minutes.

Example 1

In example 1, the effect of moving the fluorine precursor and the oxygen source was analyzed to determine what effect it had on surface area of the soot particle formed during deposition and the fluorine content in the soot particle. In the example four (4) different burner configurations were examined as indicated in table 1-1 below. In the example, the locations of oxygen source and the fluorine precursor were systematically varied. Additionally, in the example overall flowrates of components were maintained constant throughout the example. Thus, the macro-partial pressure of the fluorine doping species was maintained substantially constant at about 0.41 atm.

TABLE 1-1

| | Burner Configuration | | | | |
|---|---|---|---|---|---|
| Run | Fume (l/min) | 1 (l/min) | 2 (l/min) | 3 (l/min) | Soot Deposition Rate (g/min) |
| Control | $SiCl_4$ (1.0) $O_2$ (2.0) $CF_4$ (4.0) | $O_2$ (2.0) | $CH_4$ (5.5) $O_2$ (4.95) | $O_2$ (2.0) | 0.12 |
| Test 1 | $SiCl_4$ (1.0) $CF_4$ (4.0) | $O_2$ (4.0) | $CH_4$ (5.5) $O_2$ (4.95) | $O_2$ (2.0) | 0.12 |
| Test 2 | $SiCl_4$ (1.0) | $O_2$ (4.0) $CF_4$ (4.0) | $CH_4$ (5.5) $O_2$ (4.95) | $O_2$ (2.0) | 0.04 |
| Test 3 | $SiCl_4$ (1.0) | $CF_4$ (4.0) | $CH_4$ (5.5) $O_2$ (4.95) | $O_2$ (6.0) | 0.06 |

The burner used to deposit the soot had a central fume tube in the center of the burner face with a diameter of about 0.18 inches. Opening 1 of the burner consisted of a plurality of 18 openings, substantially concentrically aligned around the fume tube. The diameter of each opening was about 0.036 inches. The diameter of the pattern composed of the 18 openings was about 0.34 inches. The distance from the an outer edge of the fume tube to one of the openings which comprise opening 1 was at least about 0.062 inches. Opening 2 consisted of a plurality of 24 openings, substantially concentrically spaced around opening 1. The diameter of each individual opening for opening 2 was about 0.036 inches. The diameter of the pattern of openings was about 0.53 inches. The distance from the an outer edge of the fume tube to one of the openings which comprise opening 2 was at least about 0.157 inches. Opening 3 consisted of a plurality of 32 openings arranged concentrically around opening 2. Each individual opening in opening 32 had a diameter of about 0.036 inches. The pattern of opening 3 had a diameter of about 0.72 inches. The distance from an outer edge of the fume tube to one of the openings which comprise opening 3 was at least about 0.252 inches. The face of the burner sloped inward at an angle of about 13°, therefore individual openings of opening 1, 2, and 3, were all titled toward the center of the burner face by about 13°.

The results of the testing are listed in table 1-2 below and illustrated in FIG. 11.

TABLE 1-2

| EXP | F (wt %) | ρ (g/cc) | Area (m2/g) | Deposition (g/min) | Soot collected (g) | Run time (min) | Soot dia (min) |
|---|---|---|---|---|---|---|---|
| Cntrl | 1.88 | 0.330 | 20.72 | 0.12 | 7.33 | 60 | 12.31 |
| 3 | 1.71 | 0.281 | 26.52 | 0.12 | 6.94 | 60 | 12.63 |
| 1 | 2.25 | 0.167 | 43.47 | 0.04 | 2.28 | 63 | 11.15 |
| 2 | 1.88 | 0.171 | 50.49 | 0.06 | 3.51 | 60 | 12.1 |

The weight percent of fluorine in each soot preform was measured in accordance with a quantitative fluorine analysis method. One such method may use pyrohydrolysis followed by ion selective electrode analysis. The method that may be used to determine the fluorine weight percent in a soot preform comprises mixing a 200 mg sample of the soot with about 1500–4000 (3500–4000) mg uranium trioxide. The mixture is heated in a pyrohydrolysis tube (available from Quartz Scientific, Inc., Fairport, Ohio) at about 1130° C. while steam is introduced into the tube.

Typically hydrogen fluoride is formed in a vapor phase and it is condensed. A sample of at least about 250 ml of the hydrogen fluoride is collected. 10 ml of the hydrogen fluoride is mixed with 10 ml of a buffer of TISAB (available from Fisher Scientific #SB 175-4) for analysis. Usually ion selective electrodes (ISE) may be used to determine ppm of fluorine in the sample. The ISE may be available from Corning Incorporated of Corning, N.Y., such as model 455. The weight percent of fluorine is calculated from the ppm data collected.

Figure 11:
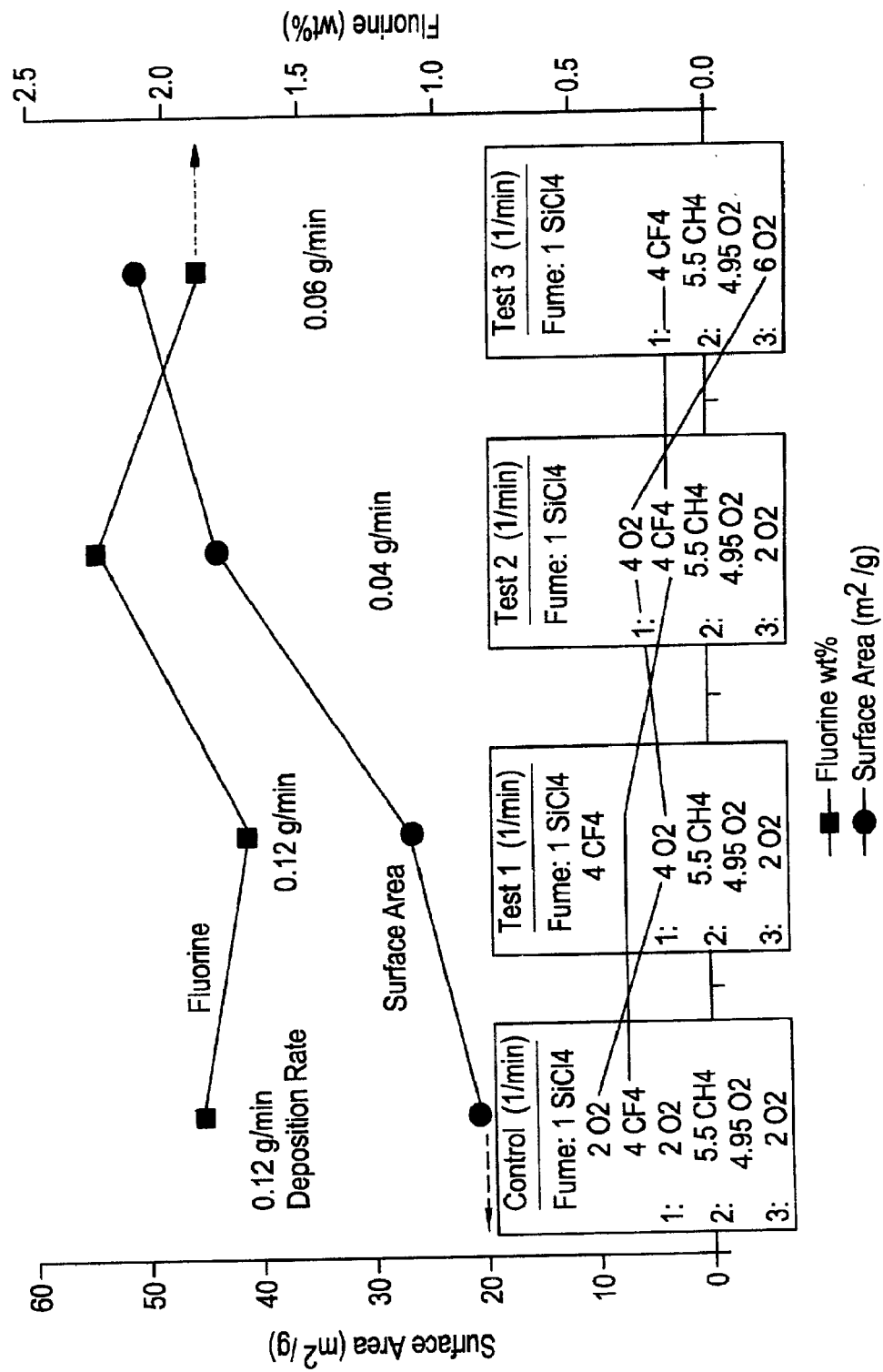
FIG. 11 is a graph of the surface area and fluorine weight percent of fluorine-doped soot particles formed in accordance with the invention and a control.

The results of the example are shown in FIG. 11. FIG. 11 shows a trend that moving the oxygen source and the fluorine precursor away from the silicon precursor increases the surface area of the soot particle formed. In comparing the control to test 3, the surface in test 3 was about 2.5 times larger than the surface area of the particle formed under the control condition. Though not meant to be bound by theory, it is believed that increasing the separation between the silicon precursor and the oxygen source delays the reaction to form the silica particle, which favors the formation of smaller diameter particles with a larger soot surface area.

Example 2

In Example 2, the effect of reaction separation outside of the presence of a fluorine precursor was examined. In this example an undoped silica soot was formed and deposited on a mandrel. The locations of the oxygen source and fuel were varied to determine the effect on surface area of the soot particle formed along with deposition rate and density of the soot particle. The components were discharged from a burner for deposition as indicated in table 2-1 below.

TABLE 2-1

| Run | Fume (l/min) | 1 (l/min) | 2 (l/min) | 3 (l/min) | 4 (l/min) | 5 (l/min) |
|---|---|---|---|---|---|---|
| Test 2-1 | $SiCl_4$ (1.0) | $O_2$ (2.0) | $O_2$ (2.0) | $O_2$ (2.0) | $CH_4$ (5.5) $O_2$ (4.95) | $O_2$ (2.0) |
| Test 2-2 | $SiCl_4$ (1.0) | — | $CH_4$ (5.5) $O_2$ (4.95) | $O_2$ (7.0) | $CH_4$ (6.0) $O_2$ (5.4) | $O_2$ (2.0) |
| Test 2-3 | $SiCl_4$ (1.0) | — | — | $O_2$ (4.0) | $CH_4$ (5.5) $O_2$ (4.95) | $O_2$ (2.0) |

Figure 12:
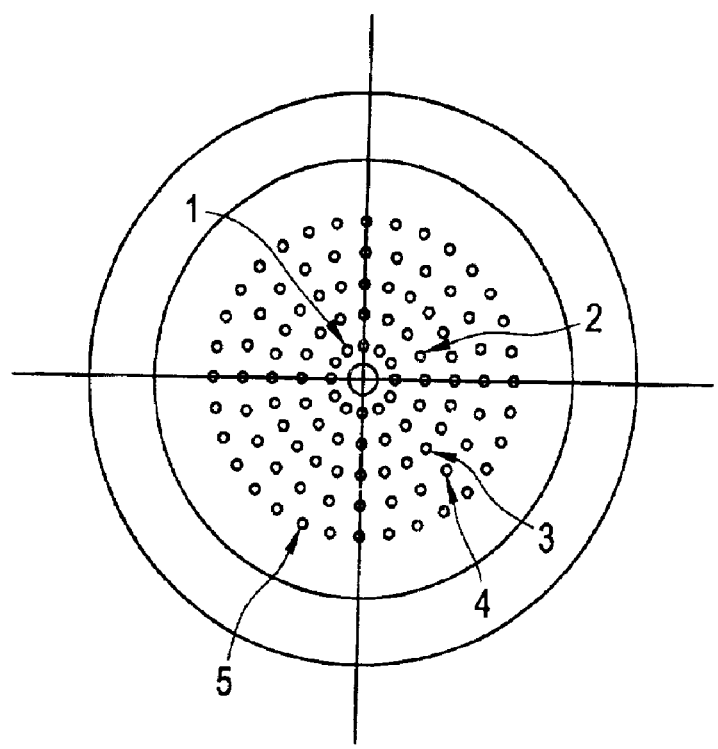
FIG. 12 is front view of a burner used in example 2.
Figure 13:
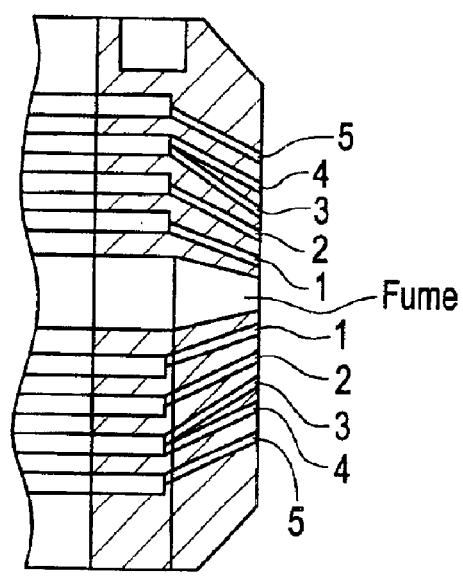
FIG. 13 is an elevated cross-sectional view of the burner illustrated in FIG. 12.

The burner used in example 2 is shown in FIGS. 12 and 13. FIG. 12 is a front view of the burner. The burner face depicted in FIG. 12 includes a fume tube, the fume tube has a diameter of about 0.156 inches. Opening 1 consists of about 12 holes equally spaced apart and substantially concentrically spaced around the fume. The diameter of each hole was about 0.036 inches. The diameter of the pattern for opening 1 is about 0.33 inches. The distance from the an outer edge of the fume tube to one of the openings which comprise opening 1 was at least about 0.069 inches. Opening 2 consists of about 16 holes equally spaced apart and substantially concentric to opening 1. Each hole has a diameter of about 0.036 inches. The pattern of opening 2 has a diameter of about 0.59 inches. The distance from an outer edge of the fume tube to one of the openings which comprise opening 2 was at least about 0.199 inches.

Opening 3 consists of about 18 holes equally spaced apart and substantially concentric to opening 2. Each hole has a diameter of about 0.036 inches. The pattern of opening 3 has a diameter of about 0.82 inches. The distance from an outer edge of the fume tube to one of the openings which comprise opening 3 was at least about 0.314 inches. Opening 4 consists of about 24 holes equally spaced apart and substantially concentric to opening 3. Each hole has a diameter of about 0.036 inches. The pattern of opening 4 has a diameter of about 1.09 inches. The distance from the outer edge of the fume tube to one of the openings which comprise opening 1 was at least about 0.449 inches. Opening 5 consists of about 32 holes equally spaced apart and substantially concentric to opening 4. Each hole has a diameter of about 0.036 inches. The pattern of opening 5 has a diameter of about 1.49 inches. The distance from the outer edge of the fume tube to one of the openings which comprise opening 5 was at least about 0.649 inches.

Figure 14:
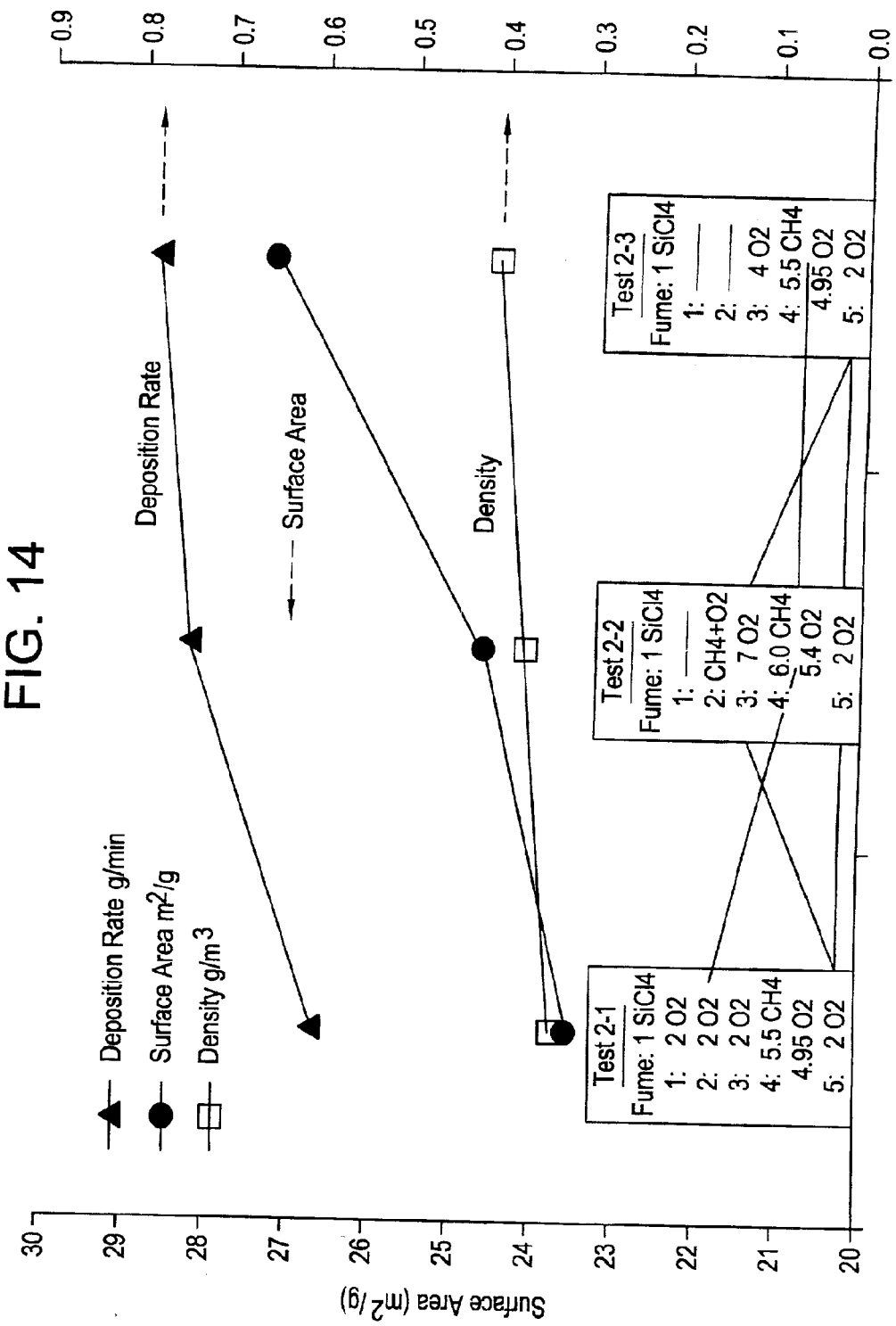
FIG. 14 is a graph of the surface area of soot particles formed in accordance with the invention and a control without the presence of fluorine in the deposition atmosphere.

The surface area, deposition rate, and density results of the example are shown in FIG. 14. As shown in FIG. 14, the surface area of the soot particle formed increased as the oxygen source was moved further away from the silicon precursor source. The increase in the soot particle surface increased about 20% from test run 2-1 to test run 2-3. Also, the deposition rate increased as the oxygen source moved further away from the silicon precursor.

Example 3

In example 3, the same burner was used as in example 2 and the $CF_4$ was included as one of the precursors. In this example, the location of $CF_4$ and oxygen relative to the silicon precursor ($SiCl_4$) was systematically varied. The alignment of the precursors is shown below in table 3-1.

TABLE 3-1

| Exp | Fume (l/min) | 1 (l/min) | 2 (l/min) | 3 (l/min) | 4 (l/min) | 5 (l/min) |
|---|---|---|---|---|---|---|
| 3-1 | $SiCl_4$ (1.0) $CF_4$ (4.0) | — | $CH_4$, $O_2$ | $O_2$ (7.0) | $CH_4$ (7.0) $O_2$ (6.3) | $O_2$ (2.0) |
| 3-2 | $SiCl_4$ (1.0) $CF_4$ (4.0) | — | $CH_4$, $O_2$ | $O_2$ (7.0) | $CH_4$ (6.0) $O_2$ (5.4) | $O_2$ (2.0) |
| 3-3 | $SiCl_4$ (1.0) $CF_4$ (4.0) $O_2$ (1.0) | $O_2$ (2.0) | $O_2$ (2.0) | $O_2$ (4.0) | $CH_4$ (5.5) $O_2$ (4.95) | $O_2$ (2.0) |
| 3-4 | $SiCl_4$ (1.0) | $O_2$ (4.0) | $O_2$ (4.0) | $CF_4$ (4.0) | $CH_4$ (5.5) $O_2$ (4.95) | $O_2$ (2.0) |
| 3-5 | $SiCl_4$ (1.0) | $O_2$ (4.0) | $CF_4$ (4.0) | $O_2$ (4.0) | $CH_4$ (5.5) $O_2$ (4.95) | $O_2$ (2.0) |

In tests 3-1 and 3-2, the total flow rate of $CH_4$ and $O_2$ to the burner face comprised the flow rate stated in opening 4, a portion of the flow rate was directed into opening 2.

Figure 15:
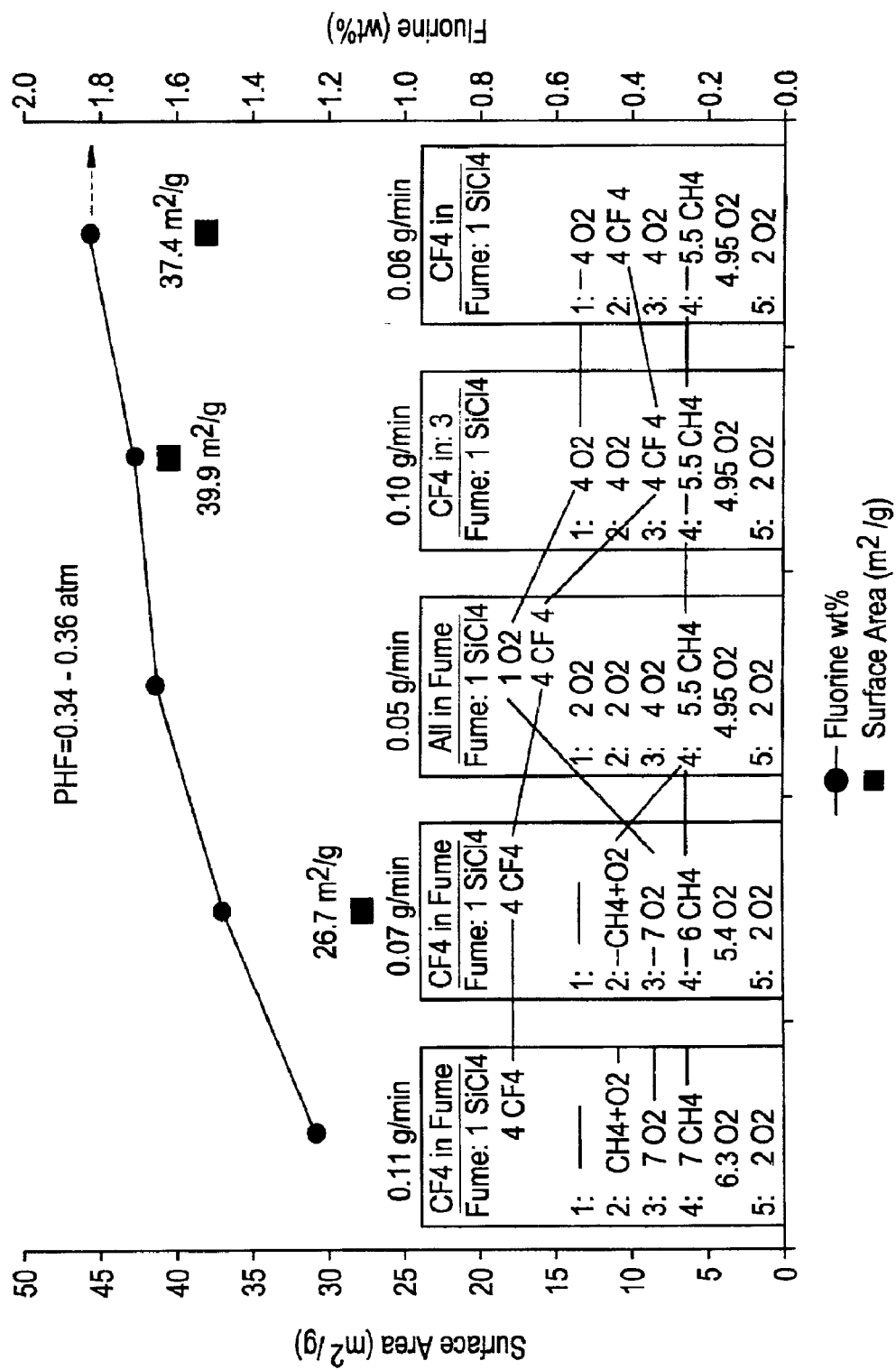
FIG. 15 is a graph of the surface area and fluorine weight percent of fluorine-doped soot particles formed in accordance with the invention and a control.

The results of the example are shown in FIG. 15. Illustrated in FIG. 15 are the deposition rate, the surface area of the particles formed in tests 3-2, 3-4, and 3-5, and the fluorine weight percent of the particles formed. Also, shown in FIG. 15 is that the macro partial pressure of HF in the deposition atmosphere remained substantially constant from about 0.34 atm to about 0.36 atm. Tests 3-4 and 3-5, in which both the oxygen source and the fluorine precursor were removed from the silicon precursor fume, resulted in soot particles with the highest surface area in this example and also with the highest fluorine concentration.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A method of making a fluorine doped soot comprising:
    delivering a silicon containing precursor to a first opening in a burner face comprising a plurality of openings, said first opening substantially free of oxygen;
    delivering a source of oxygen to a second opening in said burner face, wherein said second opening is spaced apart from said first opening;
    delivering a fluorine precursor to a third opening of said burner face, said fluorine precursor comprising CF4 and said third opening spaced apart from said first and second openings;
    delivering a fuel to a burner opening such that said fuel reacts with said fluorine of said fluorine precursor, said fuel comprising an H containing compound; and
    wherein said delivering of said fluorine precursor and said delivering of said fuel comprises delivering substantially equal molar amounts of F and H.

2. The method according to claim 1, wherein said burner opening comprises a fourth opening spaced apart from said first and second openings.

3. The method according to claim 1 wherein a reaction product of a reaction between said fluorine of said fluorine precursor and fuel comprises HF.

4. The method according to claim 1 wherein said silicon precursor and said oxygen source react to form a soot particle having a surface area of more than about 20 $m^2/g$.

5. The method according to claim 1 wherein said second opening is spaced apart from said first opening such that said surface area of said soot particle comprises about 25 $m^2/g$ or more.

6. The method according to claim 1 wherein said second opening comprises an outermost opening of said burner face.

7. The method according to claim 1 wherein a location of said first opening comprises a center of said burner face.

8. The method according to claim 1 wherein said first, second, and third openings comprises a series of coaxially spaced apart openings.

9. The method of claim 1 wherein said third opening comprises a plurality of openings, each having a circular opening and equally spaced apart from said first opening.

10. The method according to claim 1 wherein said second opening is spaced apart farther from said first opening than said third opening is spaced apart from said first opening.

11. The method according to claim 1 wherein said third opening is spaced farther apart from said first opening than said second opening is spaced apart from said first opening.

12. A method of making a fluorine doped soot comprising:
    delivering a silicon containing precursor to a first opening in a burner face, said first opening being substantially free of an oxygen source;
    delivering a fluorine precursor to a second opening in said burner face, wherein said second opening is spaced apart from said first opening; and
    delivering a fuel to a third opening of said burner face, said third opening comprising a plurality of openings, each having a circular shape and equally spaced apart from said first opening.

13. The method according to claim 12 wherein a reaction product of a reaction between said fluorine of said fluorine precursor and said fuel comprises HF.

14. The method according to claim 12 wherein said fuel comprises a H containing compound and said fluorine precursor comprises $CF_4$.

15. The method according to claim 12 wherein said delivering of said fluorine precursor and said delivering of said fuel comprises delivering substantially equal molar amounts of F and H.

16. The method according to claim 12 wherein a location of said first opening comprises a center of said burner face.

17. The method according to claim 12 wherein said first, second, and third openings comprises a series of spaced apart openings.

18. The method according to claim 12 further comprising delivering a source of oxygen to a fourth opening in said burner face, said fourth opening spaced apart from said first opening such that said silicon containing precursor and said oxygen source react to form a soot particle having a surface area of more than about 20 $m^2/g$.

19. The method according to claim 18 wherein said delivering of said oxygen source occurs at a rate effective to substantially prevent fluorine of said fluorine precursor reacting with said silicon containing precursor prior to formation of said particle.

20. The method according to claim 18 wherein said surface area of said soot particle comprises at least about 25 $m^2/g$.

21. A method of making a fluorine doped soot comprising:
   delivering a silicon containing precursor to a first opening in a burner face, said first opening substantially free of oxygen;
   delivering a fluorine precursor to a second opening in said burner face, wherein said second opening is spaced apart from said first opening; and
   delivering a fuel to a third opening of said burner face, said third opening spaced apart from said first opening;
   combusting said fuel and said fluorine precursor to form a deposition atmosphere having substantially equal molar amounts of F and H; and
   wherein a relationship of alignment among said first, second, and third openings is sufficient so that said fluorine and said fuel reacts to form HF in a concentration greater than a concentration of $SiF_4$ formed from a reaction of said fluorine precursor with said silicon containing precursor.

22. The method of claim 21 wherein said fuel comprises a hydrogen containing component and said fluorine precursor comprises $CF_4$.

23. The method of claim 21 further comprising delivering an oxygen source to said third opening wherein an effective amount of said oxygen source delivered comprises less than about a stoichiometric amount relative to said fuel.

24. The method according to claim 21 wherein said second opening comprises a plurality of openings, each of said openings having a circular shape and equally spaced apart from said first opening.

25. A method of making a fluorine doped soot comprising:
   delivering a silicon containing precursor to a first opening in a burner face, said first opening substantially free of oxygen;
   delivering a source of oxygen to a second opening in said burner face, wherein said second opening spaced apart from said first opening, and delivering a fluorine precursor to said second opening of said burner face; and
   delivering a fuel to a burner opening such that said fuel reacts with said fluorine precursor.

26. The method according to claim 25, wherein said burner opening comprises a third opening spaced apart from said first and second openings.

27. The method according to claim 25 wherein a reaction product of a reaction between said fluorine of said fluorine precursor and fuel comprises HF.

28. The method according to claim 25 wherein said fuel comprises a H containing compound and said fluorine precursor comprises $CF_4$.

29. The method according to claim 25 wherein said delivering of said fluorine precursor and said delivering of said fuel comprises delivering substantially equal molar amounts of F and H.

30. The method according to claim 25 wherein said silicon containing precursor and said oxygen source react to form a soot particle having a surface area of more than about 20 $m^2/g$.

31. The method according to claim 30 wherein said surface area of said soot particle comprises about 25 $m^2/g$ or more.

32. The method according to claim 25 wherein a location of said first opening comprises a center of said burner face.

33. The method according to claim 25 wherein said first and second openings comprise a pair of coaxially spaced apart openings.

34. The method of claim 25 wherein said second opening comprises a plurality of openings, each having a circular shape and equally spaced apart from said first opening.

* * * * *